United States Patent
Tokutomi

(10) Patent No.: US 7,329,352 B2
(45) Date of Patent: Feb. 12, 2008

(54) NITRIFYING METHOD OF TREATING WATER CONTAINING AMMONIUM-NITROGEN

(75) Inventor: Takaaki Tokutomi, Tokyo (JP)

(73) Assignee: Kurita Water Industries Ltd., Tokyo (JP)

( * ) Notice: Subject to any disclaimer, the term of this patent is extended or adjusted under 35 U.S.C. 154(b) by 0 days.

(21) Appl. No.: 11/496,408

(22) Filed: Aug. 1, 2006

(65) Prior Publication Data

US 2006/0283796 A1 Dec. 21, 2006

Related U.S. Application Data

(63) Continuation of application No. PCT/JP2005/001889, filed on Feb. 9, 2005.

(30) Foreign Application Priority Data

Mar. 1, 2004 (JP) .............................. 2004-056399

(51) Int. Cl.
*C02F 3/00* (2006.01)
(52) U.S. Cl. ..................................... 210/620; 210/739
(58) Field of Classification Search ........ 210/620–628, 210/739

See application file for complete search history.

(56) References Cited

U.S. PATENT DOCUMENTS

2005/0242027 A1* 11/2005 Tokutomi et al. ........... 210/610

FOREIGN PATENT DOCUMENTS

| JP | 2003-10883 | 1/2003 |
| JP | 2003-53387 | 2/2003 |
| JP | 2003-245689 | 9/2003 |

OTHER PUBLICATIONS

The sequencing batch reactor as a powerful tool for the study of slowly growing anaerobic ammonium-oxidizing microorganisms M. Strous •J.J. Heijnen •J.G.Kuenen M.S.M. Jetten Application Microbiology Biotechnology (1998) 50: 589-596.

* cited by examiner

*Primary Examiner*—Chester T. Barry
(74) *Attorney, Agent, or Firm*—Manabu Kanesaka

(57) ABSTRACT

In treating water containing ammonium-nitrogen by a combination of a nitrification process and autotrophic denitrification bacteria, high efficiency denitrification treatment is achieved by providing adequate ratio between nitrite and ammonia in effluent of the nitrification process. Ammonium-nitrogen concentration of the raw water introduced to a nitrification reactor and the ammonium-nitrogen concentration of the nitrified liquid from the nitrification reactor is measured, and on the basis of the measurement, the flow volume for aeration by a blower would be controlled. From the difference in $NH_4$—N concentration between the influent and the effluent of the nitrification reactor, nitrite concentration A in the nitrified liquid is calculated, and ratio A/B of the nitrite concentration A with the ammonia concentration B in the nitrified liquid is calculated. The flow volume for aeration by the blower to the nitrification reactor is controlled such that the A/B becomes 1.1 or more, preferably from 1.1 to 2.0.

13 Claims, 4 Drawing Sheets

NITRIFYING METHOD OF TREATING WATER CONTAINING AMMONIUM-NITROGEN

CROSS REFERENCE TO RELATED APPLICATION

This is a continuation application of PCT/JP2005/001889 filed on Feb. 9, 2005.

FIELD OF THE INVENTION

The present invention relates to a method for nitrification by aerating water containing ammonium-nitrogen in the presence of ammonia-oxidizing bacteria and, particularly, to a nitrifying method of water containing ammonium-nitrogen by conducting nitrite type nitrification. Moreover, the present invention relates to a method for treatment of water containing ammonium-nitrogen in which denitrification treatment by autotrophic bacteria is conducted after the nitrite type nitrification.

BACKGROUND OF THE INVENTION

Ammonium-nitrogen contained in wastewater is one of causative agents of eutrophication in such as river, lake, and sea and has to be sufficiently removed. Generally, ammonium-nitrogen in wastewater is converted into nitrogen gas through a two-staged biological reaction process consisting of a nitrification process and a denitrification process. In the nitrification process, ammonium-nitrogen in the waste water is oxidized into nitrite-nitrogen by ammonia-oxidizing bacteria and a part of thus obtained nitrite-nitrogen is further oxidized into nitrate-nitrogen by nitrite oxidizing bacteria. In the denitrification process, the nitrite-nitrogen and the nitrate-nitrogen are converted into nitrogen gas by denitrifying bacteria as heterotrophic bacteria, using organic materials as an electron donor.

However, the conventional nitrification-denitrifying method has a shortage of high running cost because it requires organic materials such as methanol as an electron donor in the denitrification process and large amount of oxygen in the nitrification process.

Recently, a method for denitrification by reacting ammonium-nitrogen and nitrite-nitrogen using autotrophic microorganisms (hereinafter, sometimes referred to as "ANAMMOX bacteria") with the ammonium-nitrogen acting as an electron donor and the nitrite-nitrogen acting as an electron acceptor has been proposed. This method does not require addition of organic materials and is able to lower the cost compared to the conventional method using heterotrophic denitrifying bacteria. In addition, the autotrophic microorganisms generate lower amount of sludge than that of the heterotrophic microorganisms because of lower yield of the autotrophic microorganisms, thereby reducing the amount of excess sludge compared to the method utilizing heterotrophic denitrifying bacteria. Moreover, $N_2O$ observed in case of the conventional nitrification-denitrifying method is not generated, thereby reducing load on the environment.

The biological denitrification process utilizing ANAMMOX bacteria was reported in Strous, M, et al., Appl. Microbiol. Biotechnol., 50, p. 589-596 (1998). It is believed that ammonium-nitrogen and nitrite-nitrogen are decomposed into nitrogen gas in the following reaction:

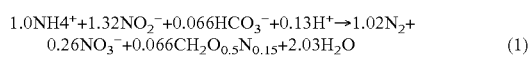

$$1.0NH_4^+ + 1.32NO_2^- + 0.066HCO_3^- + 0.13H^+ \rightarrow 1.02N_2 + 0.26NO_3^- + 0.066CH_2O_{0.5}N_{0.15} + 2.03H_2O \quad (1)$$

To conduct the biological denitrification treatment using the ANAMMOX bacteria, it is required to conduct nitrite type nitrification in which ammonium-nitrogen in wastewater is treated with ammonia-oxidizing bacteria in such a manner that the oxidation is stopped when the ammonium-nitrogen is oxidized into nitrous acid before the ammonium-nitrogen is oxidized into nitric acid.

It is known that nitrite type nitrification reaction could be achieved by controlling the DO (dissolved oxygen) concentration to be kept low. In other words, by supplying merely required amount of oxygen to oxidize ammonium-nitrogen into nitrite-nitrogen so as to inhibit oxidizing reaction of nitrite-nitrogen to nitrate nitrogen, nitrite type nitrification could be achieved. For keeping the DO concentration low, the DO concentration in the reactor is measured by a DO sensor and the flow volume for aeration is controlled on the basis of the measurement.

In an experimental apparatus of small volume, precise control of DO concentration would be available so as to achieve the nitrite type nitrification. In actual water treatment apparatus, however, distribution of DO concentration would occur in the reactor where the aeration is conducted, and in general, DO sensor has a difficulty in accurate continuous measurement. For this reason, in DO concentration control of actual apparatus, it is impossible to evenly control the DO concentration in the reactor at a lower level such as in 0.1 mg/L order over a long period for reliable nitrite type nitrification so that a part of nitrite would be oxidized into nitric acid due to excess aeration.

JP 2003-10883A described that nitrite type nitrification can be stably and reliably conducted by adjusting the flow volume for aeration in such a manner that the concentration of residual ammonium-nitrogen in the reactor or effluent of the reactor is kept at 20 mg/L or more.

In case of controlling only the concentration of ammonium-nitrogen in the effluent of nitrification process as the aforementioned JP 2003-10883A, concentration ratio between ammonia and nitrite in the nitrified liquid is not controlled.

SUMMARY OF THE INVENTION

It is an object of the present invention to provide a method for treating water containing ammonium-nitrogen by a combination of the nitrification process and the aforementioned autotrophic denitrification bacteria, capable of achieving high efficiency denitrification treatment by providing adequate ratio between nitrite and ammonia in water flowing out of the nitrification process.

According to a nitrifying method of water containing ammonium-nitrogen of a first aspect of the present invention, water containing ammonium-nitrogen is introduced into a nitrification reactor and is aerated in the presence of ammonia-oxidizing bacteria so as to nitrify the water, wherein a ratio A/B between the molar concentration A of nitrite and the molar concentration B of ammonia in the effluent of the nitrification reactor is controlled to be 1.1 or more.

When the ratio A/B between the nitrite concentration and the ammonia concentration in the effluent the nitrification reactor is 1.1 or more, a high efficiency of denitrification with autotrophic-bacteria could be achieved.

According to a treating method of water containing ammonium-nitrogen of a second aspect of the present invention, water containing ammonium-nitrogen is subjected to denitrification treatment with autotrophic bacteria after being nitrified according to the method for nitrification of a first aspect the present invention.

DETAILED DESCRIPTION OF THE INVENTION

Figure 1:
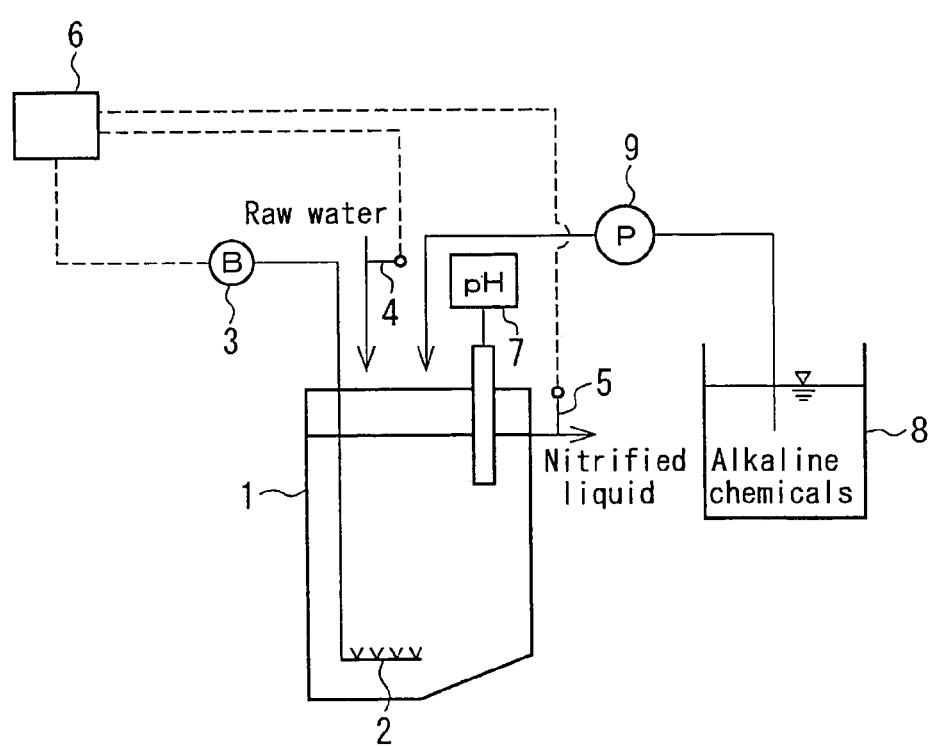
FIG. 1 is a schematic diagram showing an embodiment of the method for nitrification of water containing ammonium-nitrogen according to the present invention.

In the present invention, it is preferable to control the operational factor (at least one of flow volume for aeration, hydraulic retention time, and influent quantity of water to a nitrification reactor) by any one of the following Methods 1-3 for adjusting the ratio between ammonia and nitrite in the effluent of the nitrification reactor.

Method 1

At least one of ammonium-nitrogen concentration and Kjeldahl nitrogen concentration of the influent into the nitrification reactor is measured and, on the basis of the measurement, a target value of ammonia concentration or nitrite concentration in the effluent where the A/B ratio of the effluent is 1.1 or more is calculated.

In the nitrification process of biologically nitrifying organic nitrogen or ammonium-nitrogen into nitrite, the relationship between an operational factor and a quality of treated water such as the relationship between flow volume for aeration and nitrite concentration in the treated water is previously calculated. Then, the operational factor is controlled to obtain the nitrified liquid having the target ammonia concentration or nitrite concentration.

Method 2

An ammonium-nitrogen concentration and a nitrite nitrogen concentration in the effluent are measured and the A/B ratio of the effluent is calculated.

An operational factor is controlled such that the A/B ratio of the nitrified liquid becomes 1.1 or more.

Method 3

At least one of an ammonium-nitrogen concentration and a Kjeldahl nitrogen concentration of influent into the nitrification reactor is measured and, on the basis of the measurement, a target ammonia concentration or nitrite concentration of effluent is calculated. In addition, at least one of Kjeldahl nitrogen concentration, ammonium-nitrogen concentration, and nitrite- nitrogen concentration of effluent is measured and the A/B ratio in the effluent is calculated.

On the basis of these, an operational factor is controlled such that the A/B ratio in the nitrified liquid becomes 1.1 or more. For example, the A/B ratio in the nitrified liquid is compared with the target A/B ratio calculated from the quantity of the influent water and the flow volume for aeration or the like is controlled to make the A/B ratio of the nitrified liquid closer to the target value.

In any of the aforementioned methods 1-3, the operational factor should be controlled such that the ratio A/B of the nitrite concentration and the ammonia concentration in the nitrified liquid becomes in a range preferably of from 1.1 to 2.0, more preferably of from 1.2 to 1.5, especially preferably of from 1.3 to 1.4.

Relationship between the concentration of ammonia and the concentration of the nitrite in the nitrified liquid and the operational factor for controlling the same are as follows.

Relationship between the concentration of ammonia and the concentration of the nitrite in the nitrified liquid and the operational factor for controlling the same are as follow.

As nitrifying bacteria oxidize ammonia using oxygen in a biological nitrification reaction, it is possible to adjust the amount of nitrite contained in the nitrified liquid by controlling the amount of oxygen to be supplied to a reactor with changing the flow volume for aeration.

When a flow volume for aeration is controlled to be constant, it is able to adjust the amount of nitrous acid contained in the nitrified liquid by varying the hydraulic retention time. A retention time may be varied by varying the influent quantity of water or by changing the number of reactors to be used for treatment in case that the plurality of reactors are arranged in parallel.

Preferably, the nitrifying method of water containing ammonium-nitrogen of the present invention is carried out by using a measuring apparatus which measures at least one of the ammonium-nitrogen concentration of influent water and the ammonium-nitrogen concentration of nitrified liquid, an arithmetic unit which calculates the target value from the measurement, and a control unit to bring the nitrous acid/ammonia ratio A/B in the nitrified liquid close to the target. In case of using the retention time in the nitrification reactor to control the A/B ratio, it is preferable to further use a unit for measuring the influent quantity of the raw water. Instead of measuring the ammonium-nitrogen concentration directly, Kjeldahl nitrogen concentration measurement could be used.

Referring to the measuring apparatus for measurement of the ammonia or Kjeldahl nitrogen concentration, any measuring apparatus based on any measurement principles may be used if it can measure the ammonium-nitrogen concentration or the Kjeldahl nitrogen concentration.

The arithmetic unit is preferable to calculate target values of ammonia concentration and nitrous acid concentration in the nitrified liquid from the measured values of ammonium-nitrogen concentration or Kjeldahl nitrogen concentration and calculates the required manipulated value from the relationship between the previously expected manipulated value and concentration of nitrous acid generated. On the basis of the calculation results, the control unit controls the flow volume for aeration, the retention time, or the Influent quantity of time,or the influent quantity of water.

As the water containing ammonium-nitrogen is nitrified and then denitrified by autotrophic bacteria in the present invention, the nitrous acid concentration and the ammonium-nitrogen concentration are within a suitable ratio during the denitrification process, whereby the denitrification reaction is conducted effectively.

As shown in the aforementioned reaction formula (1), nitric acid is generated as a by-product in the denitrification reaction with autotrophic bacteria. Therefore, a post denitrification process for removal of nitric acid may be further set after the denitrification process with autotrophic bacteria.

In this case, when ammonia remains in the effluent of denitrification process with the autotrophic bacteria, the remaining ammonia could not be removed fully in the post denitrification process thus the ammonia is discharged out of the system. Therefore, it is preferable to prevent ammonia from practically remaining in the effluent of autotrophic denitrification process. Specifically, the ammonia concentration in the effluent of denitrification with autotrophic bacteria is preferably 50 mg/L or less, more preferably 10 mg/L or less. In the post denitrification process, not only nitric acid but also nitrous acid could be removed. Therefore, nitrous acid residue in the water treated by denitrification with autotrophic bacteria does not matter.

When controlling the A/B ratio of the effluent from nitrification treatment to be 1.3 or more as mentioned above, no or little ammonia remains in the treated water from the denitrification process with the autotrophic bacteria.

Hereinafter, a specific embodiment of the present invention will be described in detail with reference to the drawings.

FIG. 1 is a schematic diagram showing an embodiment of the method for nitrification of water containing ammonium-nitrogen according to the present invention.

In FIG. 1, a nitrification reactor (aeration tank) 1 is provided with an air diffuser tube 2 for aerating air supplied from the blower 3.

NH4-N concentration measuring apparatuses 4, 5 are arranged to measure the ammonium-nitrogen concentration of the raw water introduced to the nitrification reactor 1 and the ammonium nitrogen concentration of the nitrified liquid from the nitrification reactor 1. On the basis of the measurements of the NH4-N concentration measuring apparatuses 4, 5, the flow volume for aeration of the blower 3 is controlled by a blower controller 6.

As the $NH_4$—N concentration measuring apparatuses, diaphragm ion electrodes may be used.

The controller 6 calculates nitrite concentration A from the difference in $NH_4$—N concentration between the influent and the effluent of the nitrification reactor 1. The controller 6 further calculates the ratio A/B of the nitrite concentration A with the $NH_4$—N concentration B in the effluent, and controls the flow volume for aeration by the blower 3 to the nitrification reactor such that the value of the A/B becomes 1.1 or more, preferably from 1.1 to 2.0, more preferably from 1.2 to 1.5, especially preferably from 1.3 to 1.4.

In the present invention, there are no specific limitations on the type of the nitrification reactor and reactor of any type such as a sludge suspension type, a fixed bed type, a fluidized bed type, a granule process type, and a carrier addition process type such as sponge may be employed.

By controlling the flow volume for aeration on the basis of the ammonium-nitrogen concentration, the nitrite type nitrification can be stably and reliably conducted. For keeping the activity of the ammonia-oxidizing bacteria in the nitrification reactor 1 at a high level and keeping the activity of the nitrite oxidizing bacteria at a low level, it is preferable to control the pH to be in a range of from 5 to 9, especially from 7 to 8, to control the nitrous acid ion concentration to be in a range of from 50 to 10000 mg-N/L, especially from 200 to 3000 mg-N/L, to control the temperature to be in a range of from 10 to 40° C., especially from 20° C. to 35° C., and to control the nitrogen loading to be in a range of from 0.1 to 3 kg-N/$m^3$·day, especially from 0.2 to 1 kg-N/$m^3$·day in the nitrification reactor 1.

In FIG. 1, solution of alkaline chemicals (such as caustic soda solution) in an alkaline chemicals tank 8 is added to the nitrification reactor 1 through a pump 9 such that the value of the pH in the nitrification reactor 1 detected by a pH meter 7 becomes within the aforementioned range.

Effluent from the nitrification reactor 1 undergoes biological denitrification treatment using ANAMMOX bacteria (autotrophic bacteria).

Figure 2:
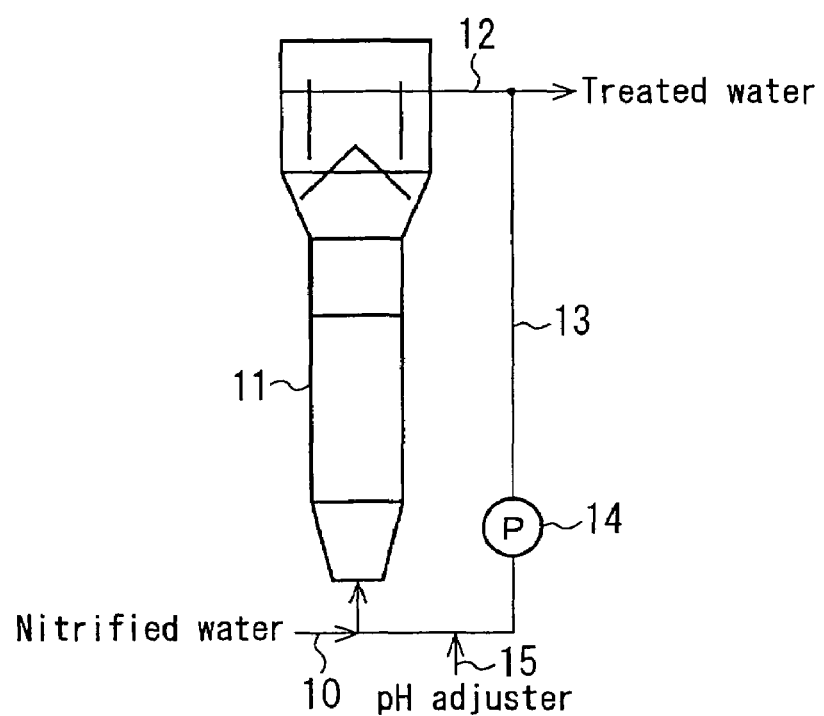
FIG. 2 is a schematic diagram of a denitrification treatment process.

FIG. 2 is a schematic illustration of a reactor suitable for denitrification treatment with autotrophic bacteria. The nitrified liquid from the nitrification process flows upwardly though a piping 10 to a vertical type reactor 11. Flocs of autotrophic bacteria exist in this reactor 11 so that denitrified water treated by denitrification with the autotrophic bacteria can be taken out through a piping 12.

By a circulation piping 13 with a circulating pump 14 diverged from the piping 12, a part of the denitrified water is returned to the reactor 11 and undergoes denitrification treatment again. To this circulation piping 13, pH adjuster is added from an adding means 15.

EXAMPLES AND COMPARATIVE EXAMPLES

Hereinafter, the present invention will be described in more details with reference to Examples and Comparative Examples.

Example 1

In FIG. 1, a sponge carrier of 90 L was placed in a nitrification reactor 1 of 300 L in volume. Activated sludge derived from sewage sludge was fed to the nitrification reactor 1 and digestive liquor of an anaerobic nitrification reactor (pH 7.5, $NH_4$—N concentration approx. 400-500 mg-N/L) was supplied as raw water to the nitrification reactor 1 at a rate of 2 $m^3$/d. Hydraulic retention time (HRT) in the reactor was approx. 3.6 hours. As measuring apparatuses 4, 5 for the $NH_4$—N concentration, diaphragm ion electrodes were used.

The ammonium concentration of the raw water and the ammonium concentration of the nitrified liquid were measured, and the target $NH_4$—N concentration of the nitrified liquid was set from the $NH_4$—N concentration of the raw water, and the flow volume for aeration by the blower 3 was controlled such that the detected actual $NH_4$—N concentration of the nitrified liquid became the target $NH_4$—N concentration. Flow volume for aeration varied in the range of from about 6 to 9.6 $m^3$/hr. Caustic soda solution (25% concentration) was injected by the pump 9 such that the value of pH in the nitrification reactor 1 detected by the pH meter 7 became 7.5.

Figure 3:
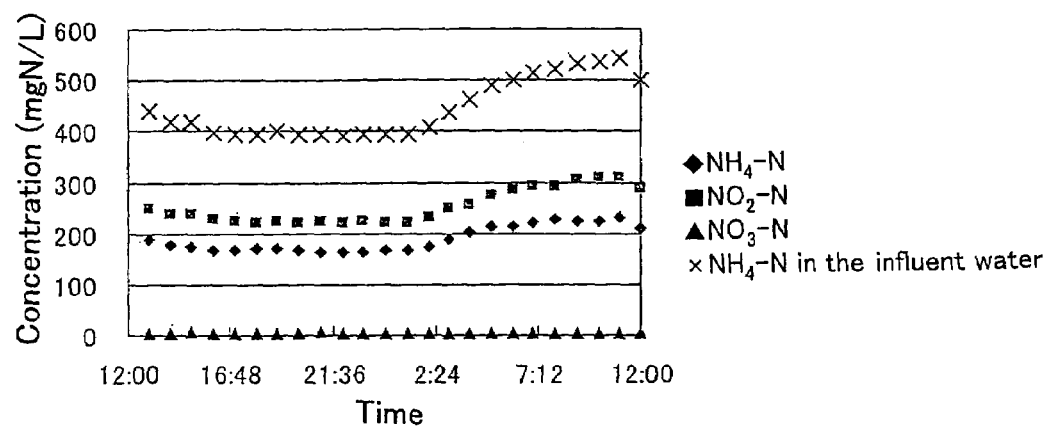
FIG. 3 is a graph showing changes with time of the $NH_4$—N concentration of raw water and the quality of treated water in Example 1.

The changes with time in $NH_4$—N concentration, $NO_2$—N concentration, and $NO_3$—N concentration of the nitrified liquid and $NH_4$—N concentration of the raw water are shown in FIG. 3. As shown in FIG. 3, $NO_3$—N exists little, and the value of the ratio A/B of the molar concentration A of $NO_2$—N and the molar concentration B of $NH_4$—N is generally in the range of from 1.3 to 1.4.

Example 2

Nitrified liquid from the nitrification reactor 1 of Example 1 was fed to the denitrification reactor 11 shown in FIG. 2 and underwent denitrification treatment. The volume of the reactor 11 was 300 L and was filled with 180 L of granule of ANAMMOX bacteria. Hydrochloric acid solution (10% concentration) was added by adding means 15 such that the pH of the reactor 11 became 7.3.

Influent quantity of the nitrified liquid was set to 2 $m^3$/d, and the HRT of the reactor 11 was set to approx. 3.6 hours.

Figure 4:
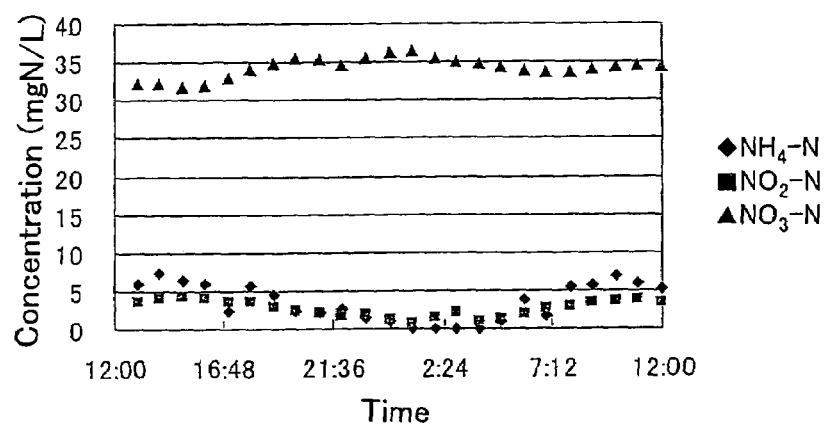
FIG. 4 is a graph showing changes with time of the $NH_4$—N concentration, the $NO_2$—N concentration, and the $NO_3$—N concentration of treated water in Example 2.

The changes with time in NH₄—N concentration, NO₂—N concentration, and NO₃—N concentration of the denitrified water are shown in FIG. 4.

As shown in FIG. 4, the NH₄—N concentration, the NO₂—N concentration, and the NO₃—N concentration of the denitrified water were extremely low.

Comparative Example 1

The same treatment was conducted to the same raw water as Example 1 except that the flow volume for aeration was set to be constant at 6 m³/hr. The changes with time in NH₄—N concentration of the raw water, NH₄—N concentration, NO₂—N concentration, and NO₃—N concentration of the nitrified liquid are shown in FIG. 5.

Figure 5:
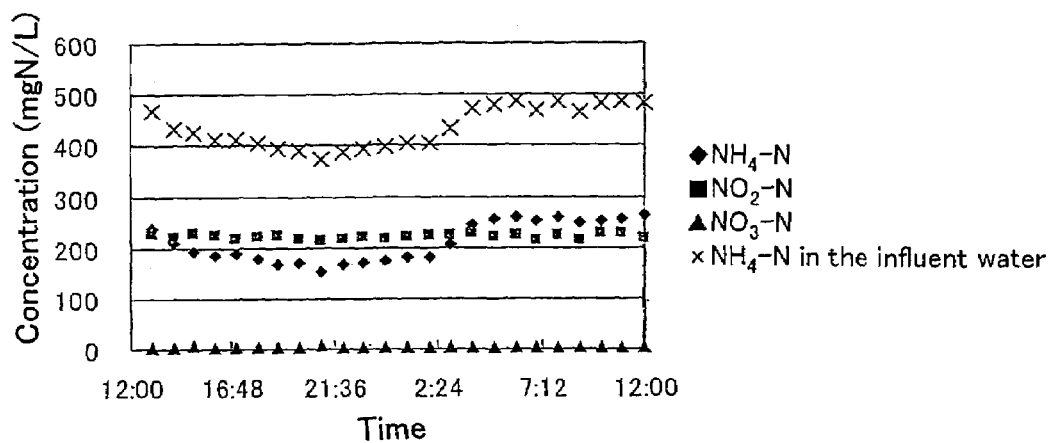
FIG. 5 is a graph showing changes with time of the $NH_4$—N concentration of raw water and the quality of treated water in Comparative Example 1.

As shown in FIG. 5, the ratio A/B varied in the range of from 0.8 to 1.4, and was mostly less than 1.3.

Comparative Example 2

The nitrified liquid of Comparative Example 1 was subjected to the same denitrification treatment as Example 2. The changes with time in NH₄—N concentration, NO₂—N concentration, and NO₃—N concentration of the denitrified water are shown in FIG. 6.

Figure 6:
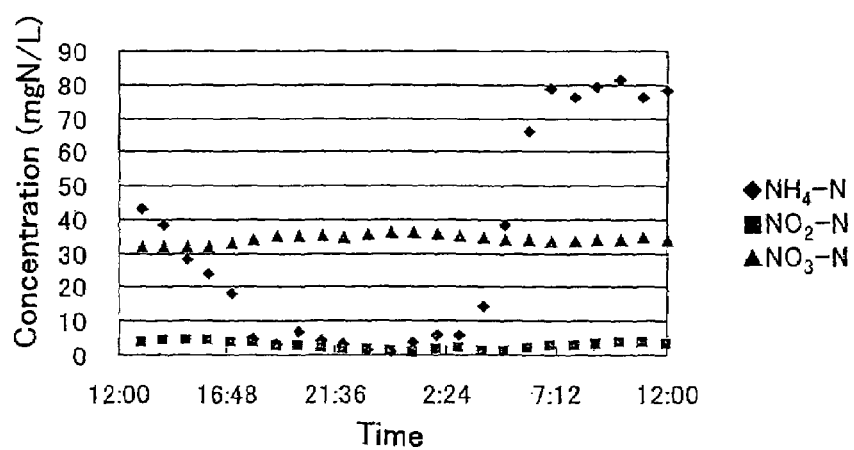
FIG. 6 is a graph showing changes with time of the $NH_4$—N concentration, the $NO_2$—N concentration, and the $NO_3$—N concentration of treated water in Comparative Example 2.

As shown in FIG. 6, in Comparative Example 2, the NH₄—N concentration and the NO₃—N concentration of the denitrified water were significantly high and the fluctuation range of NH₄—N concentration was significantly high compared to Example 2.

What is claimed is:

1. A nitrifying method of water containing ammonium-nitrogen in which water containing ammonium-nitrogen is introduced into a nitrification reactor and is aerated in presence of ammonia-oxidizing bacteria so as to nitrify the water, wherein
a ratio A/B between molar concentration A of nitrite and molar concentration B of ammonia in nitrified liquid flowing from the nitrification reactor is controlled to be 1.1 or more.

2. A nitrifying method of water containing ammonium-nitrogen as claimed in claim 1, wherein said ratio A/B is controlled to be in a range of from 1.1 to 2.0.

3. A nitrifying method of water containing ammonium-nitrogen as claimed in claim 2, wherein said ratio A/B is controlled to be in a range of from 1.2 to 1.5.

4. A nitrifying method of water containing ammonium-nitrogen as claimed in claim 3, wherein said ratio A/B is controlled to be in a range of from 1.3 to 1.4.

5. A nitrifying method of water containing ammonium-nitrogen as claimed in claim 1, wherein said ratio A/B is controlled by controlling at least one of flow volume for aeration, retention time in the nitrification reactor, and influent quantity of water to the nitrification reactor.

6. A nitrifying method of water containing ammonium-nitrogen as claimed in claim 1, wherein Kjeldahl nitrogen concentration in the water introduced into the nitrification reactor and Kjeldahl nitrogen concentration in the nitrified liquid are measured and, from a difference therebetween, the nitrite concentration A of the nitrified liquid is calculated.

7. A nitrifying method of water containing ammonium-nitrogen as claimed in claim 1, wherein ammonium-nitrogen concentration in the water introduced into the nitrification reactor and ammonium-nitrogen concentration in the nitrified liquid are measured and, from a difference therebetween, the nitrite concentration A in the nitrified liquid is calculated.

8. A nitrifying method of water containing ammonium-nitrogen as claimed in claim 1, wherein at least one of ammonium-nitrogen concentration and Kjeldahl nitrogen concentration in the water introduced into the nitrification reactor is measured and, on a basis of a measurement value, a target value of ammonia concentration or nitrite concentration in the nitrified liquid where the A/B ratio of the nitrified liquid becomes 1.1 or more is calculated, and at least one of flow volume for aeration, retention time in the nitrification reactor, and influent quantity of the water to the nitrification reactor is controlled to obtain the nitrified liquid having the target ammonia concentration or nitrite concentration.

9. A nitrifying method of water containing ammonium-nitrogen as claimed in claim 1, wherein ammonium-nitrogen concentration and nitrite concentration in the nitrified liquid are measured and the A/B ratio in the nitrified liquid is calculated, and at least one of flow volume for aeration, retention time in the nitrification reactor, and influent quantity of the water to the nitrification reactor is controlled to set the A/B ratio of the nitrified liquid to be 1.1 or more.

10. A nitrifying method of water containing ammonium-nitrogen as claimed in claim 1, wherein pH is controlled to be in a range of from 5 to 9, nitrite ion concentration is controlled to be in a range of from 50 to 10000 mg-N/L, temperature is controlled to be in a range of from 10 to 40° C., and the nitrogen loading is controlled to be in a range of from 0.1 to 3 kg-N/m³·day in the nitrification reactor.

11. A nitrifying method of water containing ammonium-nitrogen as claimed in claim 10, wherein the pH is controlled to be in a range of from 7 to 8, nitrous acid ion concentration is controlled to be in a range of from 200 to 3000 mg-N/L, temperature is controlled to be in a range of from 20 to 35° C., and nitrogen loading is controlled to be in a range of from 0.2 to 1 kg-N/m³·day in the nitrification reactor.

12. A treating method of water containing ammonium-nitrogen, said treating method comprising:
conducting said nitrifying method as claimed in claim 1 wherein the water containing ammonium-nitrogen is nitrified to become the nitrified liquid, and
conducting a denitrification process wherein the nitrified liquid is subjected to denitrification treatment with autotrophic bacteria.

13. A treating method of water containing ammonium-nitrogen as claimed in claim 12, wherein water subjected to the denitrification treatment with autotrophic bacteria is further subjected to denitrification treatment with heterotrophic bacteria after the denitrification treatment.

* * * * *